UNITED STATES PATENT OFFICE 2,463,989

PREPARATION OF ACYLATED AMINO ESTERS

Samuel M. McElvain, Madison, and Gilbert J. Stork, Milwaukee, Wis.

No Drawing. Application April 26, 1946, Serial No. 665,322

5 Claims. (Cl. 260—471)

This invention is directed to the preparation of derivatives of secondary amines and more particularly to the preparation of esters of N-acyl-di-(β-carboxyethyl)-amines.

Compounds prepared in accordance with the methods of this invention may be represented by the following formula:

$$R_1—N(CH_2CH_2COOR)_2$$

wherein $R_1$ represents an acyl radical derived from a carboxylic acid, and R in each instance represents an esterifying radical, preferably a lower alkyl radical. Illustrative examples of such compounds are N-benzoyl-di-(β-carbomethoxyethyl)-amine, N-naphthoyl-di-(β-carbethoxyethyl)-amine, N-p-toluoyl-di-(β-carbobutoxyethyl)-amine, N-acetyl-di-(β-carbethoxyethyl)-amine and N-caproyl-di-(β-carboxypropylethyl)-amine.

In the past, the preparation of compounds represented by the above formula has been quite unsatisfactory, especially because of the difficulties encountered in the necessary preparation of suitable di-(β-carboxyethyl)-aminoesters as intermediates. While the di-(β-carbethoxyethyl)-aminoesters may be prepared by interreaction of ethyl β-iodopropionate and the ethyl ester of β-alanine, or by reaction of ethyl β-bromopropionate with ammonia in the presence of silver oxide, these reactions give low yields and require relatively expensive starting materials. The preparation of the methyl ester has been proposed by the reaction of ammonia with methyl acrylate, and by considerable modification of the conditions proposed, by providing a large excess of ammonia (about 5:1) and reacting at room temperature for about 1 to 3 hours, we have found it operable with other aminoesters. Although this process requires inexpensive starting materials, it unavoidably produces a relatively low yield of the desired di-(β-carboxyethyl)-aminoester, since in addition to the formation of the desired secondary aminoester there is always formed a corresponding or greater amount of the tertiary aminoester, tri-(β-carboxyethyl)-aminoester.

We have discovered that a mixture of the secondary and tertiary aminoesters, even a crude mixture thereof, or even the tertiary aminoester alone, may be reacted to utilize not only the secondary aminoester but also the tertiary aminoester in the production of the desired N-carboxyacyl-di-(β-carboxyethyl)-aminoester. We have discovered that if the mixture, or the tertiary aminoester alone, is acylated under elevated temperature, a yield of the desired N-carboxyacyl aminoester is obtained not only from any secondary aminoester present but also from the tertiary aminoester.

By our invention we eliminate the necessity of removing the tertiary aminoester and of purifying the secondary aminoester which is to be acylated. Instead, we utilize the tertiary aminoester and we may even start with the tertiary aminoester alone. A particular advantage of this invention is that a crude mixture of secondary and tertiary aminoesters may be utilized thus greatly enhancing the ease of preparation of the carboxyacylated secondary aminoester. For example, a suitable ester of acrylic acid may be reacted with ammonia, the excess ammonia removed and the resulting crude mixture of secondary and tertiary aminoesters and unreacted acrylic ester subjected to carboxyacylation. The over-all yield of desired product obtained by such procedure has been found to range upwards of 70 percent.

The utilization of the tertiary aminoester in our process appears to result from a combination of chemical actions. At the elevated temperature at which the acylation is carried out, the tertiary aminoester appears to undergo a pyrolytic decomposition, which if allowed to proceed to completion produces a mixture consisting mainly of ammonia, acrylic ester, and remaining tertiary aminoester. The reaction, however, appears to occur stepwise, with unstable secondary aminoester occurring at least momentarily and subject both to further decomposition and to reversible reaction to the tertiary aminoester. It appears that under the acylation conditions, however, the decomposition is interrupted, the reversible reaction goes in the direction to produce secondary aminoester, and this is acylated as it is produced, to yield a stable N-carboxyacyl-di-(β-carboxyethyl)-amine, which is the desired product.

In carrying out our invention, the carboxyacylating agent used may be a carboxylic acid anhydride, or a carboxyacyl halide of the class of chlorides and bromides. In the latter case it is preferable to include in the reaction mixture a basic substance capable of reacting with the hydrohalide formed in the reaction.

The process of our invention, when a carboxyacyl halide is used as the acylating agent and with the presence of a basic compound, may be illustrated by the following equation:

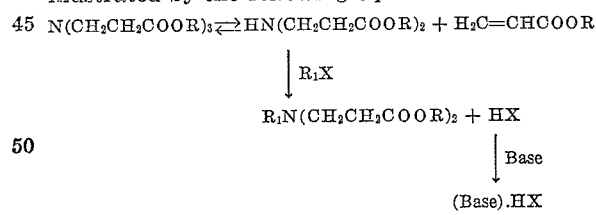

wherein R represents an esterifying radical, $R_1$ represents carboxyacyl radical, and X represents one of the halogens chlorine and bromine.

Broadly our invention may be carried out as follows: We may start with a mixture of secondary and tertiary aminoesters, or with tertiary aminoester alone; or we may prepare a crude mixture of secondary and tertiary aminoesters by reaction of ammonia with an ester of acrylic acid, and use this crude mixture. The aminoester or mixture of aminoesters may be dissolved in a non-reactive solvent, for example xylene. A roughly equivalent amount of carboxyacylating agent is added and the mixture is heated. Reaction occurs, to produce the desired carboxyacylated secondary aminoester, which may be isolated in any suitable manner, as by distillation.

When the reaction is carried out in a solvent with a carboxylic acid anhydride as the acylating agent, the resulting mixture comprises a clear solution containing dissolved carboxyacylated secondary aminoester, the acid produced from the acid anhydride used for the acylation, and other by-products. When a carboxyacyl halide is used as the acylating agent the reaction mixture comprises a solution of the desired carboxyacylated secondary aminoester, by-products, and a precipitate comprising a hydrohalide salt.

When a carboxyacyl halide is used as the acylating agent a portion of the tertiary aminoester is rendered unavailable for pyrolysis because of its reaction to form a salt with the hydrohalide liberated during the acylation of the secondary aminoester. In a preferred form when a carboxyacyl halide is used, our invention contemplates the incorporation in the reaction mixture of about a molar equivalent of a basic compound, preferably a stable tertiary amine, capable of forming a salt with a hydrohalogen acid, thus making all of the tertiary aminoester available for the desired reaction. Examples of amines suitable for this purpose are the higher-boiling trialkylamines such as tributylamine and triamylamine.

As before mentioned, the acylating agents suitable for the purposes of this invention are acid anhydrides, acyl chlorides, and acyl bromides derived from carboxylic acids. The character of the acid or acyl radical of the acylating agent may vary, and may be any stable radical capable of existence as a carboxylic acid anhydride, carboxylacyl chloride, or carboxyacyl bromide. Likewise, the esterifying groups present in the secondary and tertiary aminoesters are not critical for the purposes of this invention and the choice of the esterifying group may be governed largely by its availability or by what is desired in the final product. Because of the ready availability of the esterifying groups, we prefer to use di-($\beta$-carboxyethyl)-amine and tri-($\beta$-carboxyethyl)-amine which are esterified by lower alkyl groups such as the methyl and ethyl groups.

A solvent may be and desirably is used in carrying out this invention. Preferred solvents are inert solvents boiling between about 80° C. and 180° C. at atmospheric pressure, such as benzene, toluene, xylene and p-cymene.

With such solvents, the reaction may be carried out at atmospheric pressure, conveniently under reflux, and the reaction temperature maintained high enough to effect the desirably rapid pyrolysis of the tertiary aminoester. The reaction may also be carried out at superatmospheric pressure, as when it is desired to use a lower boiling solvent, or when the carboxyacylating agent employed possesses a relatively low boiling point. The use of superatmospheric pressure makes it possible to maintain a satisfactory reaction temperature without loss of the more volatile reactants or solvents.

To avoid excessive undesirable decomposition, the reaction temperature desirably should not exceed about 190° C. The reaction time required is largely dependent upon the temperature at which the reaction is effected. Illustratively, when xylene is used as a solvent and the reaction is carried out at a refluxing temperature, about 8 to 10 hours is required for the completion of the reaction. Relatively shorter or longer reaction periods are required when the reaction is carried out at a lower or a higher temperature.

When the reaction is effected at atmospheric pressure and at refluxing temperature, the course of the reaction is conveniently followed by observing the temperature of the refluxing solution. During the first several hours of the acylation the temperature of the refluxing solution steadily falls because of the formation of low-boiling acrylic ester by pyrolysis of the tertiary aminoester. Continued refluxing produces little or no further drop in temperature and the absence of further temperature fall indicates substantial completion of the reaction.

This invention is further illustrated by the following specific examples.

*Example 1*

Preparation of N-benzoyl-di-($\beta$-carbethoxyethyl)-amine from pure tri-($\beta$-carbethoxyethyl)-amine.

To a solution of 270 g. of tri-($\beta$-carbethoxyethyl)-amine dissolved in 250 ml. of toluene are added 150 g. of benzoyl chloride. The solution is refluxed for about 20 hours, and then cooled. A crystalline precipitate of tri-($\beta$-carbethoxyethyl)-amine hydrochloride weighing 130 g. forms, and is separated by filtration. The filtrate is washed successively with dilute potassium carbonate solution, dilute hydrochloric acid, and water; and the toluene is removed by evaporation. The residue comprising N-benzoyl-di-($\beta$-carbethoxyethyl)-amine is purified by distillation. It boils at 196–198° C. at about 0.4 mm. pressure. Yield, 123 g.—45 percent, on the tri-($\beta$-carbethoxyethyl)-amine employed.

*Example 2*

Preparation of N-benzoyl-di-($\beta$-carbethoxyethyl)-amine from pure tri-($\beta$-carbethoxyethyl)-amine and with tributylamine copresent.

To a solution of 63 g. of tri-($\beta$-carbethoxyethyl)-amine dissolved in 60 ml. of toluene are added 42 g. of tributylamine and 37 g. of benzoyl chloride. The solution is refluxed for about 20 hours, 30 ml. of alcohol are then added and the refluxing continued for another hour to destroy excess benzoyl chloride. In this case, the hydrochloride salt formed is of tributylamine. This is removed by extraction with water. The residue is treated according to the procedure described in Example 1, to obtain the desired N-benzoyl-di-($\beta$-carbethoxyethyl)-amine. Yield, 50 g.—78 percent, based on the tri-($\beta$-carbethoxyethyl)-amine employed.

*Example 3*

Preparation of N-benzoyl-di-($\beta$-carbethoxyethyl)-amine from pure tri-($\beta$-carbethoxyethyl)-amine and with tributylamine copresent.

The same procedure is used as described in Example 2 except that the solvent is xylene instead of toluene and the period of refluxing is shortened from 20 hours to 8 hours. Yield, 50 g.—78 percent.

*Example 4*

Preparation of N-benzoyl-di-($\beta$-carbethoxyethyl)-amine from a crude mixture of di-($\beta$-carbethoxyethyl)-amine and tri-($\beta$-carbethoxyethyl)-amine and with tributylamine copresent.

The crude mixture of the secondary and tertiary amines is prepared by dissolving 248 g. of cold ethyl acrylate in 270 ml. of liquid ammonia, placing this solution in a steel bomb, and allowing it to stand for about two hours. The excess ammonia is evaporated at atmospheric pressure and the unreacted ethyl acrylate is recovered by vacuum evaporation. The resulting crude mixture, comprising tri-($\beta$-carbethoxyethyl)-amine, di-($\beta$-carbethoxyethyl)-amine, and traces of ethyl acrylate, is dissolved in 285 ml. of xylene. To the solution are added 185 g. of tributyl-amine and 145 g. of benzoyl chloride. A considerable amount of heat is evolved from the addition of the benzoyl chloride because of the immediate reaction of the benzoyl chloride with the di-($\beta$-carbethoxyethyl)-amine present in the reaction mixture. The reaction mixture is refluxed for about 8 hours, 100 cc. of ethanol are added and the refluxing continued 1 hour. The reaction mixture is then cooled and filtered. The filtrate is washed successively with sodium carbonate solution, dilute hydrochloric acid, and water; and the xylene is removed by evaporation. The residue comprising N-benzoyl-di-($\beta$-carbethoxyethyl)-amine is purified by vacuum distillation. Yield, 70 percent, based on the amount of utilized ethyl acrylate.

Example 5

Preparation of N-benzoyl-di-($\beta$-carbethoxyethyl)-amine from a crude mixture of di-($\beta$-carbethoxyethyl)-amine and tri-($\beta$-carbethoxyethyl)-amine and with tributylamine copresent.

N-benzoyl-di-($\beta$-carbethoxyethyl)-amine is prepared by the procedure described in Example 4 except that the ethyl acrylate is not recovered by vacuum evaporation from the reaction mixture obtained by reacting ethyl acrylate with ammonia.

Example 6

Preparation of N-acetyl-di-($\beta$-carbethoxyethyl)-amine from pure tri-($\beta$-carbethoxyethyl)-amine and acetic anhydride.

To a solution of 317 g. of tri-($\beta$-carbethoxyethyl)-amine dissolved in 250 ml. of toluene are added 65 g. of acetic anhydride. The solution is refluxed for about 20 hours. The reaction mixture is cooled, washed successively with dilute potassium carbonate solution, dilute hydrochloric acid, and water, and the toluene is removed by evaporation. The residue comprising N-acetyl-di-($\beta$-carbethoxyethyl)-amine is purified by distillation. It boils at 183–185° C. at about 5 mm. pressure. Yield, 85 percent of theory.

Example 7

Preparation of N-acetyl-di-($\beta$-carbethoxyethyl)-amine from pure tri-($\beta$-carbethoxyethyl)-amine and acetyl chloride, with tributylamine copresent.

To a solution of 63 g. of tri-($\beta$-carbethoxyethyl)-amine dissolved in 60 ml. of toluene are added 42 g. of tributylamine and 20 g. of acetyl chloride. The solution is placed in a steel bomb and heated at about 150° C. for about 10 hours. The bomb is then cooled and opened, the reaction mixture extracted with water to remove tributylamine hydrochloride, and the residue is evaporated to remove the toluene. The residue comprising N-acetyl-($\beta$-carbethoxyethyl)-amine is purified by distillation.

Example 8

Preparation of N-n-caproyl-di-($\beta$-carbomethoxyethyl)-amine from a crude mixture of di- and tri-($\beta$-carbomethoxyethyl)-amine, with n-caproyl chloride in the presence of tributylamine.

124 g. of cold methyl acrylate are dissolved in 135 ml. of liquid ammonia. The mixture is placed in a steel bomb and allowed to stand for about two hours. The excess ammonia is evaporated at atmospheric pressure and the unreacted methyl acrylate is recovered by vacuum evaporation. The residue comprising tri-($\beta$-carbomethoxyethyl)-amine, di-($\beta$-carbomethoxyethyl)-amine and traces of methyl acrylate is dissolved in 140 ml. of xylene. To the solution are added 90 g. of tributylamine and 70 g. of n-caproyl chloride. A considerable amount of heat is evolved upon the addition of caproyl chloride. The reaction mixture is refluxed for about 10 hours, 50 cc. of ethanol are added and the refluxing continued one hour. The reaction mixture is then cooled and filtered. The filtrate is washed successively with water, sodium carbonate solution, dilute hydrochloric acid, and water; and the xylene is removed by evaporation. The residue comprising N-n-caproyl-di-($\beta$-carbomethoxyethyl)-amine is purified by vacuum distillation. It boils at 190–195° C. at about 3 mm. pressure. Yield, 65 percent of theory.

We claim:

1. The process of preparing a carboxyacylated di-($\beta$-carboxyethyl)-amine ester, which comprises heating to a temperature of about 80° C. to 180° C. under conditions which cause no appreciable loss of reactants, a reaction mixture comprising a tri-($\beta$-carboxyethyl)-amine ester, an inert solvent and a carboxyacylating agent of the class consisting of carboxylic acid anhydrides, carboxyacyl chlorides and carboxyacyl bromides, and isolating the carboxyacylated di-($\beta$-carboxyethyl)-amine ester.

2. The process of preparing a carboxyacylated di-($\beta$-carboxyethyl)-amine ester, which comprises refluxing a reaction mixture comprising a tri-($\beta$-carboxyethyl)-amine ester, an inert solvent boiling between about 80° C. and 180° C., and a carboxyacylating agent of the class consisting of carboxylic acid anhydrides, carboxyacyl chlorides and carboxyacyl bromides, and isolating the carboxyacylated di-($\beta$-carboxyethyl)-amine ester.

3. A process according to claim 1 in which the reaction is carried out in the presence of a tertiary amine and the carboxyacylating agent is a carboxyacyl chloride.

4. A process according to claim 1 in which the reaction is carried out in the presence of a tertiary amine and the carboxyacylating agent is a carboxyacyl bromide.

5. A process according to claim 3 in which the tri-($\beta$-carboxyethyl)-amine ester is tri-($\beta$-carbethoxyethyl)-amine and the carboxyacylating agent is benzoyl chloride.

SAMUEL M. McELVAIN.
GILBERT J. STORK.

REFERENCES CITED

The following references are of record in the file of this patent:

UNITED STATES PATENTS

| Number | Name | Date |
|---|---|---|
| 1,992,615 | Hoffmann et al. | Feb. 26, 1935 |
| 2,017,537 | Hoffmann et al. | Oct. 15, 1935 |
| 2,195,974 | Reppe et al. | Apr. 2, 1940 |
| 2,401,429 | Kung | June 4, 1946 |

OTHER REFERENCES

Morsch: "Monatshefte für Chem.," vol. 63 (1933), pp. 220–235.